United States Patent
Bueche et al.

(10) Patent No.: US 8,903,828 B1
(45) Date of Patent: *Dec. 2, 2014

(54) METHOD AND SYSTEM FOR CONFIGURING A MULTI-PATH INDEX

(75) Inventors: Edward C. Bueche, Pleasanton, CA (US); Francisco Borges, Paris (FR); Petr Pleshachkov, The Hague (NL); Shanshan Quan, Shanghai (CN); Marc Brette, Domene (FR); Venkatesan Chandrasekaran, Pleasanton, CA (US)

(73) Assignee: EMC Corporation, Hopkinton, MA (US)

( * ) Notice: Subject to any disclaimer, the term of this patent is extended or adjusted under 35 U.S.C. 154(b) by 47 days.

This patent is subject to a terminal disclaimer.

(21) Appl. No.: 13/161,666

(22) Filed: Jun. 16, 2011

(51) Int. Cl.
*G06F 17/30* (2006.01)

(52) U.S. Cl.
USPC .................................... 707/742; 707/769

(58) Field of Classification Search
USPC ................................. 707/742, 769
See application file for complete search history.

(56) References Cited

U.S. PATENT DOCUMENTS

| 7,664,742 | B2 * | 2/2010 | Pettovello | 707/715 |
| 7,685,203 | B2 * | 3/2010 | Murthy | 707/769 |
| 7,783,619 | B2 * | 8/2010 | McBeath et al. | 707/706 |
| 7,814,117 | B2 * | 10/2010 | Baby et al. | 707/769 |
| 7,840,590 | B2 * | 11/2010 | Tam et al. | 707/769 |
| 7,930,295 | B2 * | 4/2011 | McBeath et al. | 707/713 |
| 8,219,563 | B2 * | 7/2012 | Baby et al. | 707/742 |
| 8,346,809 | B2 * | 1/2013 | Breining et al. | 707/791 |
| 2008/0114803 | A1 * | 5/2008 | Chinchwadkar et al. | 707/102 |
| 2012/0254189 | A1 * | 10/2012 | Shah | 707/741 |

* cited by examiner

*Primary Examiner* — Kim Nguyen
(74) *Attorney, Agent, or Firm* — Dergosits & Noah LLP; Todd A. Noah

(57) ABSTRACT

A method for configuring a multi-path index includes receiving and storing, in a database management system configured to store a structured document in its native format, a multi-path index definition associated with a data model corresponding to the structured document. In an embodiment, the multi-path index definition includes a sub-path definition that covers a plurality of descendant elements of a root element of the data model and includes at least one index property. Each of a plurality of descendant elements covered by the sub-path definition is automatically indexed according to the at least one index property. The multi-path index definition is stored in a data structure associated with a multi-path index configured to store indexed data from the structured document.

19 Claims, 5 Drawing Sheets

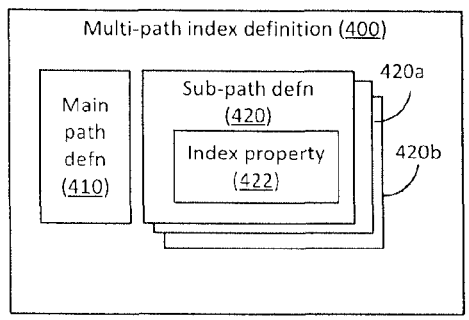
*FIG. 4*
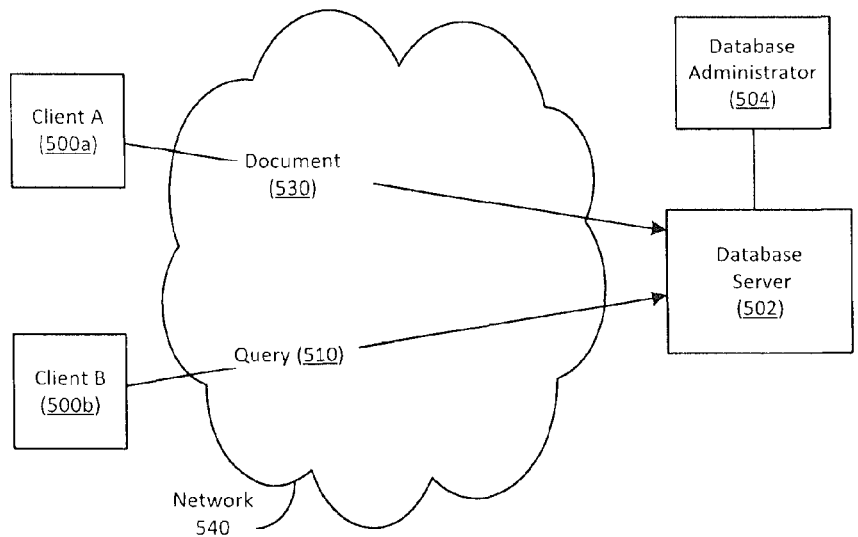
*FIG. 6*
*FIG. 5*

METHOD AND SYSTEM FOR CONFIGURING A MULTI-PATH INDEX

BACKGROUND

Structured documents have nested structures, i.e., structures that define hierarchical relationships between elements of a document. Documents written in Extensible Markup Language (XML) are structured documents. Typically, a structured document can be represented by a data model comprising a plurality of hierarchical nodes. The term "node" is used in the Direct Object Model (DOM)-sense, which is a standard XML construct well known to those skilled in the art. In that construct, each node corresponds to an element of the XML document. Each node of the XML document can be described by a path that defines the hierarchical relationship between the node and its parent node(s). Every path begins at a root node corresponding to a root element and follows the hierarchical structure defined by the XML document. Throughout this description, the term "node" is used interchangeably with the term "element."

XML supports user-defined tags for customized descriptions of nested document structures and associated semantics. Accordingly, XML allows a user to design a customized markup language for many classes of structured documents. For example, a business can easily model a complex structure of a document, such as a purchase order, in an XML document and send the document for further processing to its business partners. This ability to define custom tags provides tremendous flexibility to users designing their documents.

As more and more business applications create and use structured documents, the challenge is to store, search, and retrieve these documents. Database management systems (DBMS) are available that are configured to receive and store structured documents in their native format. For example, EMC Documentum xDB, developed by EMC Corporation, is a high-performance and scalable native XML DBMS that can store and manage structured documents in their native format, i.e., as a nested data model. Moreover, the XML DBMS can allow database structures to be easily modified to adapt to changing information requirements.

In addition to receiving and storing structured documents, the XML DBMS also is configured to process a search query and to retrieve document(s) satisfying the query. To facilitate efficient searching, data in the structured documents is usually indexed and stored in an index. A typical index for an XML DBMS is based on a path-value model that includes a single specified XML path and an attribute key. For example, a path-value index can be defined by a single path and a sequence of keys that can be elements or attributes, and sub-paths to specific elements. Each path-value index for every key and sub-path to a key must be explicitly defined down to the element or key. Moreover, composite path-value indexes, i.e., varying combinations of single indexes, must also be explicitly defined.

Typically, each path-value index is represented as a separate b-tree index with separate keys stored in the index along with separate node pointers stored at the leaf level. A node pointer points to a document that includes the defined path and value. When the path-value index is a composite path-value index, the order in which the path-value indexes are listed affects the manner in which the values are stored in the b-tree index.

Path-value indexes present several challenges that can burden the DBMS and a database administrator. Presently, the data administrator or developer must examine characteristics of the data in a library, manually create path-value indexes, test queries, and create additional path-value indexes as needed. Path-value indexes are inflexible because many have to be defined to service a range of queries that include different combinations of keys, i.e., elements and/or values. In addition, as the number of indexes increases, system overhead increases. Moreover, for a path-value index to be used, all of its keys must be explicitly defined in the index. Because all elements must be listed in the definition, new elements introduced by a user, e.g., when the user defines a custom tag, cannot be indexed unless the database administrator defines a new path-value index corresponding to the new element.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

FIG. 4 is a block diagram illustrating an exemplary multi-path index definition according to an exemplary embodiment;

FIG. 5 is a block diagram illustrating a network in which a system for configuring a multi-path index can be implemented;

FIG. 6 is a block diagram illustrating an exemplary inverted multi-path index according to an embodiment;

DETAILED DESCRIPTION

The subject matter presented herein provides for a multi-path index that allows indexing multiple elements without requiring the explicit configuration of every single index path. According to an embodiment, a multi-path index definition specifies a sub-path definition that covers a plurality of descendant elements of a root element of a data model. The sub-path definition can be specified, in an embodiment, to cover multiple descendant elements via a modified path expression that matches multiple path expressions through patterns such as "a/b/*," "a//c," and "a//*." Accordingly, configuring the indexing of multiple descendant elements can be accomplished by a single multi-path index definition, thereby eliminating the need to define explicitly a path-value index for every element.

According to an embodiment, one or more index properties can be specified for each sub-path definition. Each index property describes how elements covered by the sub-path definition should be indexed. Accordingly, when a structured document is received, data associated with an element is indexed according to the index property. Because the sub-path definition is an open definition in that it covers multiple elements without explicitly specifying these elements, new elements can be covered by the sub-path definition and therefore indexed according to the index property.

According to an embodiment, when an element is indexed, one or more path-value pairs is generated and stored in an inverted index. The inverted index can store each path-value pair in a separate record which references the structured document. By storing each path-value pair in a separate record in the inverted index, multiple combinations of keys in a query can be processed without regard to their order in the index and which keys are present in the query.

Figure 1:
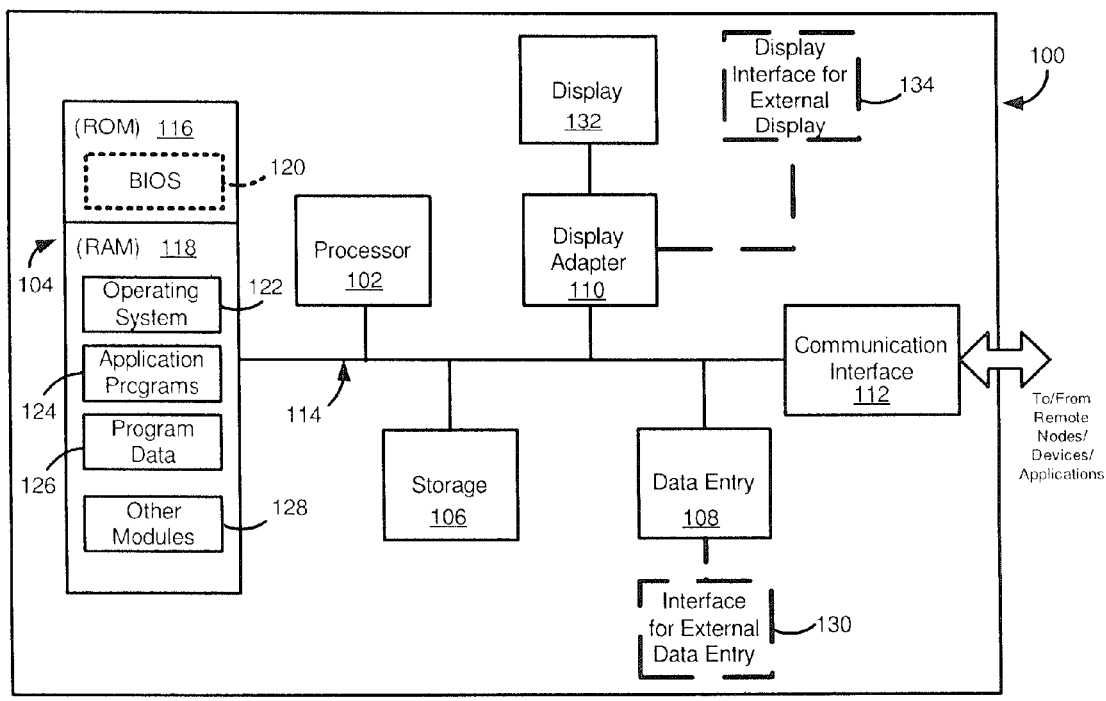
FIG. 1 is a block diagram illustrating an exemplary hardware device in which the subject matter may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

Figure 2:
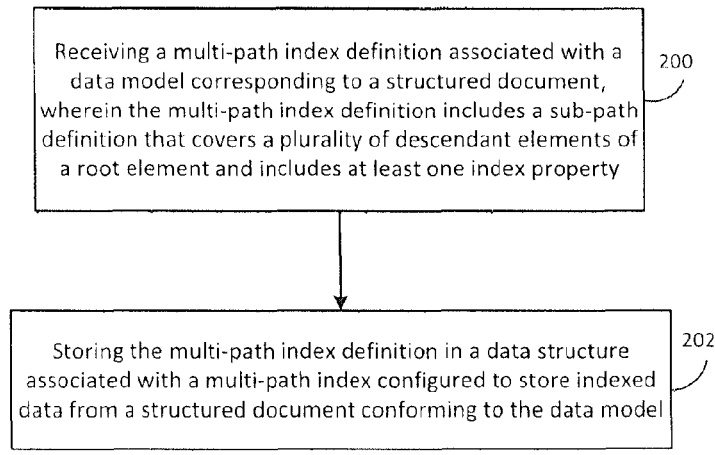
FIG. 2 is a flow diagram illustrating an exemplary method for configuring a multi-path index according to an exemplary embodiment.
Figure 3:
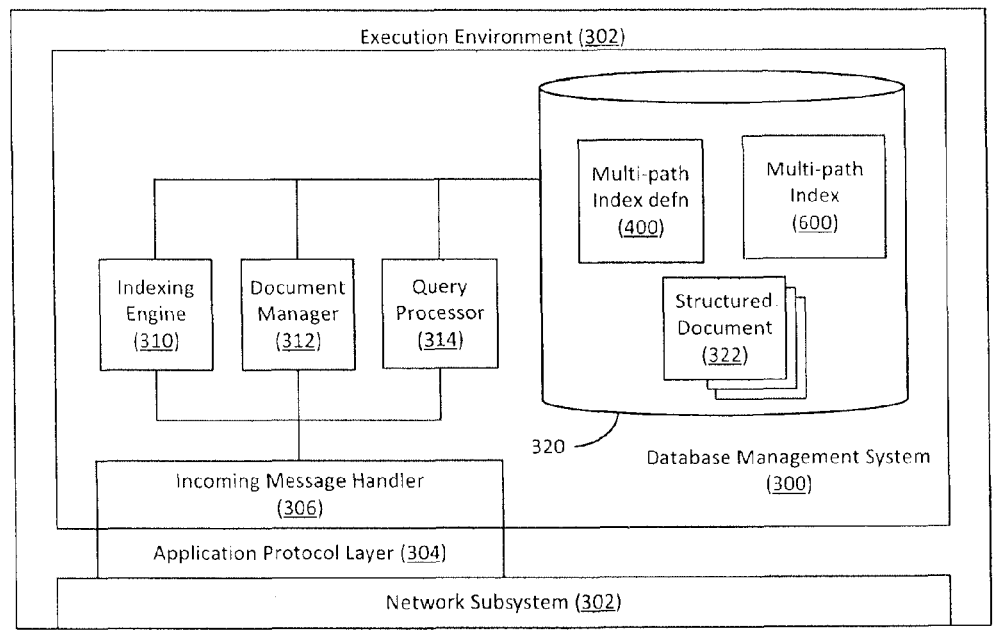
FIG. 3 is a block diagram illustrating an exemplary system for storing and managing structured documents according to an exemplary embodiment.

Referring now to FIG. 2, a flow diagram is presented illustrating a method for configuring a multi-path index according to an exemplary embodiment. FIG. 3 is a block diagram illustrating an exemplary system for receiving, storing and retrieving structured documents according to embodiments of the subject matter described herein. The method illustrated in FIG. 2 can be carried out by, for example, at least some of the components in the exemplary arrangement of components illustrated in FIG. 3. The arrangement of components in FIG. 3 may be implemented by some or all of the components of the hardware device 100 of FIG. 1.

FIG. 3 illustrates components that are configured to operate within an execution environment hosted by a computer device and/or multiple computer devices, as in a distributed execution environment. For example, FIG. 5 illustrates a plurality of computer devices 500*a*, 500*b*, 502 communicatively coupled to one another via a network 540, such as the Internet, where a database server 502 can be configured to provide an execution environment configured to support the operation of the components illustrated in FIG. 3 and/or their analogs. Exemplary computer devices can include desktop computers, servers, networking devices, notebook computers, PDAs, mobile phones, digital image capture devices, and the like.

Illustrated in FIG. 3 is a DBMS 300 including components adapted for operating in an execution environment 302. The execution environment 302, or an analog, can be provided by a computer device such as the database server 502. The DBMS 300 includes a data store 320, such as a database, that is configured to store a plurality of structured documents 322 in their native format. The structured documents 322 are managed by a document manager 312, which can be configured to receive, add, remove, and/or retrieve documents 322. A query processor 314 can be configured to receive and process data queries 510 and to invoke the document manager 312 to retrieve documents 322 satisfying the data queries 510. According to an embodiment, the DBMS 300 can be an XML DBMS and the structured documents 322 can be XML documents.

With reference to FIG. 2, in block 200, a multi-path index definition associated with a data model corresponding to a structured document is received. In an embodiment, the multi-path index definition includes a sub-path definition that covers a plurality of descendant elements of a root element of the data model and includes at least one index property. A system for configuring a multi-path index includes means for receiving the multi-path index definition. For example, FIG. 3 illustrates an indexing engine 310 configured to receive the multi-path index definition associated with the data model corresponding to a structured document.

FIG. 4 illustrates a block diagram of an exemplary multi-path index definition 400. According to an embodiment, the multi-path index definition 400 can include a main-path definition 410 that identifies the root element, i.e., the type of node, pointed to by the index. The root element can represent a single document, a specific collection of documents and/or an entire database. Accordingly, the multi-path index definition 400 can be applicable over a single document, a specific collection of documents, and/or an entire database in an embodiment.

The sub-path definition 420, in an embodiment, comprises a modified path expression configured to match a plurality of path expressions corresponding to the plurality of covered descendant elements. According to an embodiment, the modified path expression can end with a descendant element so that the sub-path definition covers a plurality of elements represented by a plurality of path expressions that include intervening elements between the root element and the descendant element. For example, a modified path expression "a//f" can cover an element represented by the path expression "a/e/f," and another element represented by the path expression "a/f." Alternatively or in addition, the modified path expression can end with a wildcard indicator so that the sub-path definition covers all descendant elements. For example, a modified path expression "a//*" can cover all of the descendant nodes of element "a." Additional examples of modified path expressions, and their descriptions are provided in Table 1 below.

TABLE 1

| Modified path expression | Description |
| --- | --- |
| a/* | Covers any direct child element of the root element "a" |
| a/elem | Covers all elements named "elem" which are direct children of the root element |
| a//elem | Covers any element named "elem," but each distinct element path is indexed separately |

According to an embodiment, the sub-path definition 420 also includes one or more index properties 422 that describe how the descendant elements covered by the modified path expression should be indexed. For example, an index property 422 can include, but is not limited to:

VALUE_COMPARISON: elements indexed for value-comparison can be used in Xquery value comparison operations FULL_TEXT_SEARCH: elements indexed for full-text-search can be used in Xquery "ftcontains" full text searches Element type definitions: the element(s) are typed by one of INT, DOUBLE, DATETIME, STRING, BOOLEAN, FLOAT ENUMERATE_REPEATING_ELEMENTS: allows index to identify the child elements of the matched element START_END_MARKERS: supports specific "ftcontains" capabilities of "at-start" and "at-end"

According to an embodiment, because the descendant elements covered by the sub-path definition 420 can be indexed according to more than one index property, the contents of the elements can be searched in more than one way. For example, when the sub-path definition 420 specifies index properties VALUE_COMPARISON and FULL_TEXT_SEARCH, the contents of the covered elements can be searched through value or through full-text search.

An exemplary multi-path index definition 400 is provided below:

Example 1

<multi-path-index main-path="/doc">
<sub-path1 full-text-search="true" modified-path="//*"/>
<sub-path2 full-text-search="true" value-comparison="true" modified-path="metadata/*"/>
<sub-path3 enumerate-repeating-elements="true" value-comparison="true" modified-path="elem1"/>
</multi-path-index>

As is shown, the multi-path index definition 400 includes three (3) sub-path definitions 420, 420a, 420c. The first sub-path definition 420 indexes the element "/doc" and every descendant element of "/doc" with a full-text index. Accordingly, full-text querying of the "/doc" element and also of any descendant elements of "/doc" is provided. For example, all of the following queries would be able to use the multi-path index:

/doc[element ftcontains "baseball"]
/doc[element1/element2 ftcontains "sfgiants"]

The second sub-path definition 420a adds a value index to every element matching the path expression "/doc/metadata/*." Examples of queries that the resulting multi-path index would be able to handle include:

/doc[metadata/name="Rivoli"
/doc[metadata/name="Rivoli" and element1/element2
/doc[metadata/name="Rivoli" and element1/element2 ftcontains "foo"
/doc[metadata/description ftcontains "goo"

The third sub-path definition 420c specifies a value index to every element matching the path expression "/doc/elem1." The presence of a sub-path on "elem1" with the enumerate_repeating_elements set allows the multi-path index to be used for queries matching on descendants of the same element. Examples of queries that the resulting multi-path index would be able to handle include:

/doc[elem1 [elem2 and elem5]]
/doc[elem1 [name='foo' and address/street='Rivoli']

According to an embodiment, the FULL_TEXT_SEARCH index property can be enhanced by also specifying a LEADING_WILDCARD index property and/or a START_END_MARKERS index property. For example, consider the following sub-path definition:

<sub-path1 full-text-search="true" start-end-markers="true" leading-wildcard="true" modified-path="//*"/>

The LEADING_WILDCARD index property adds support to queries using a wildcard as a prefix of the key. An exemplary query that would be able to use the index could be:

/doc [chapter ftcontains "he was a *ist" with wildcards]

The START_END_MARKERS index property adds support for the following queries:

/doc [chapter//line ftcontains "sfgiants" entire content]
/doc [chapter//line ftcontains "foo" at start]
/doc [chapter//line ftcontains "giantswin" at end]

In some circumstances, an element can be covered by more than one sub-path definition 420, 420a. When this occurs, the more specific sub-path definition can be applied, in an embodiment, to the element. For example, for the following two sub-path definitions 420, 420a:

<sub-path1 full-text-search="true" modified-path="//*"/>
<sub-path2 value-comparison="true" modified-path="metadata//*"/>

The second sub-path definition 420a is considered to be more specific than the first 420. Accordingly, in an embodiment, any element having a path expression matching "metadata//*" would be indexed for value comparison and not for full-text searching.

As illustrated above by the exemplary multi-path index definition 400, a first sub-path definition 420 can cover a first plurality of descendant elements and a second sub-path definition 420a can cover a second plurality of descendant elements. The first plurality of descendant elements can be automatically indexed according to a first index property 422 of the first sub-path definition 420 and the second plurality of descendant elements can be automatically indexed according to a second index property 422 of the second sub-path definition 420a. Accordingly, a single multi-path index definition 400 can be used to index different sets of elements in different indexing modes. This flexibility optimizes document indexing while minimizing system overhead.

According to an embodiment, the modified path expression of a sub-path definition 420 can cover known descendant elements as well as yet to be determined descendant elements. For example, the modified path expression "metadata/*" covers all present and future descendant elements of the "metadata" element. Accordingly, when a new element represented by a new path expression is added to the data model, and the modification to the data model is received, the indexing engine 310 can be configured, in an embodiment, to determine that the new descendant element is covered by a sub-path definition 420 of the multi-path index definition 400. For example, the indexing engine 310 can determine that the new path expression matches the modified path expression of the sub-path definition 420. Once this is determined, the new descendant element can be automatically indexed according to the one or more index properties 422 of the sub-path definition 420. Advantageously, the multi-path index definition 400 need not be changed when the data model is modified by the addition of a new descendant element.

Alternatively or in addition, a new sub-path definition 420*b* can be added to the multi-path index definition 400, in an embodiment, without necessarily triggering a re-indexing of the data. According to an embodiment, the new sub-path definition 420*c* can cover a new descendant element that is going to be imported into the database system 300 and can include one or more index properties 422. When the new sub-path definition 420*c* is received, the indexing engine 310 can be configured to update the multi-path index definition 400. Once the update is complete, new documents including the new element can be automatically indexed according to the updated multi-path index definition 400, and a re-indexing of the existing data is not required.

In an embodiment, the multi-path index definition 400 and any updates thereto can be created by a user designing and/or configuring the DBMS 300. For example, a database administrator 504 and/or a database developer can create the multi-path index definition 400, which is received by the indexing engine 310 in the DBMS 300.

Referring again to FIG. 2, in block 202, when received, the multi-path index definition 400 is stored in a data structure associated with a multi-path index configured to store indexed data from a structured document conforming to the data model. A system for configuring a multi-path index includes means for storing the multi-path index definition. For example, the indexing engine 310 can be configured to store the multi-path index definition 400 in a data structure associated with a multi-path index configured to store indexed data from a structured document conforming to the data model.

According to an embodiment, the multi-path index definition 400 is stored in the data store 320 and is accessible by the indexing engine 310. In addition to storing the multi-path index definition 400, the data store 320 can be configured to store the multi-path index 600 and the plurality of structured documents 322. Alternatively, in another embodiment, the multi-path index definition 400 and the multi-path index 600 can be stored in a first data structure (not shown) and the structured documents 322 can be stored in a second data structure 320. In other embodiments, a combination of storage schemes can be implemented. Once the multi-path index definition 400 is received and stored, the multi-path index 600 is configured and can be used to store indexed data from existing and new structured documents 322.

Figure 7:
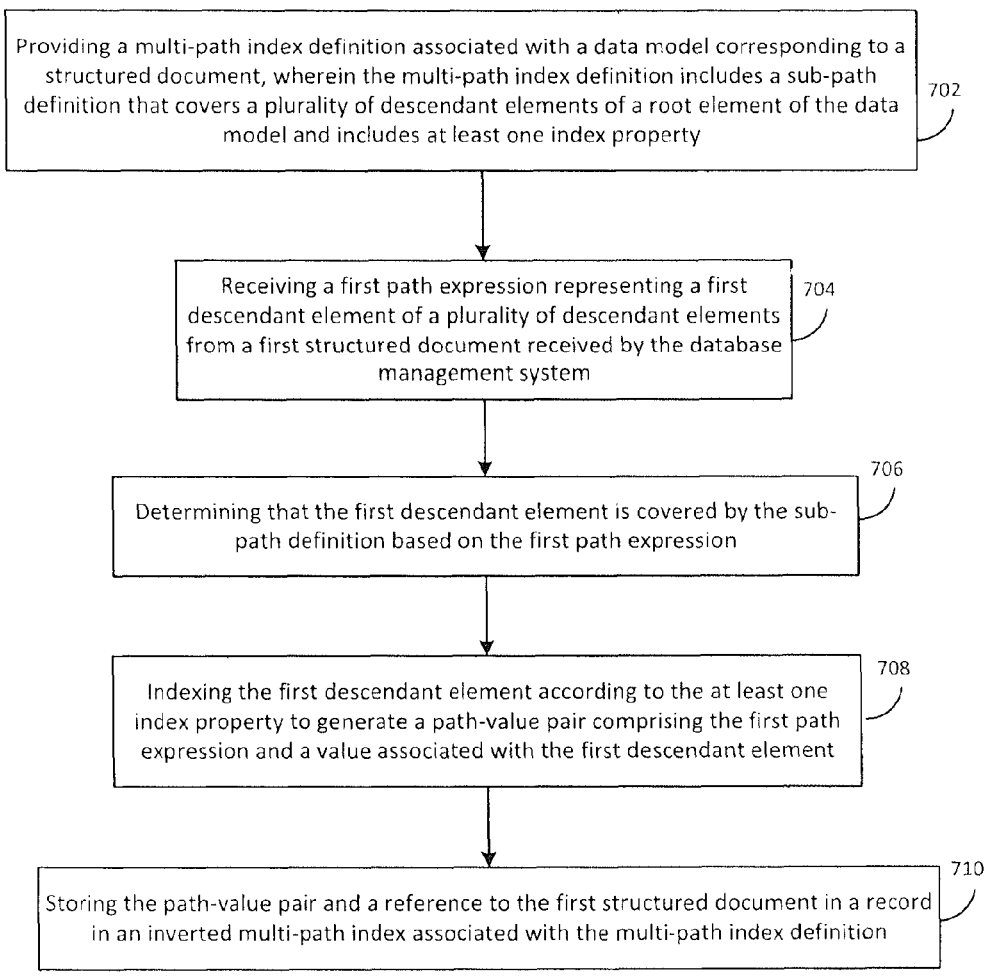
FIG. 7 is a flow diagram illustrating an exemplary method for indexing a structured document according to an exemplary embodiment.

FIG. 7 is a flow diagram illustrating a method for indexing a structured document according to an exemplary embodiment. The method illustrated in FIG. 7 can be carried out by at least some of the components in the exemplary arrangement of components illustrated in FIG. 3. As described above, and illustrated in block 702, a multi-path index definition 400 associated with a data model corresponding to a structured document 322 is provided in the database management system 300 configured to store structured documents 322 in their native format.

In block 704, a first path expression is received by the indexing engine 310 in the DBMS 300. In an embodiment, the first path expression represents a first descendant element of a plurality of descendant elements from a first structured document received by the database management system 300. According to an embodiment, the DBMS 300 receives a first structured document that comprises a root element and a plurality of descendant elements corresponding to the data model. The document manager 312 in the DBMS 300, for example, can be configured to receive the first structured document 530 from client A 500*a* over the network 540 via a network subsystem 302 and optionally an application protocol layer 304 that can encode, package, and/or reformat data for sending and receiving messages over a network layer, such as Internet Protocol (IP), and/or a transport layer, such as Transmission Control Protocol (TCP) and/or User Datagram Protocol (UDP).

When the structured document 530 is received, the document manager 312 can be configured to generate the first path expression representing the first descendant element of the plurality of descendant elements. In an embodiment, the first path expression follows a hierarchical structure of the structured document from the root element to the first descendant element. The document manager 312, for example, can invoke a parsing engine (not shown) to parse the structured document 530. Once parsed, document manager 312 can invoke a path expression generator (not shown) to create a path expression representing each of the descendant elements including the first path expression representing the first descendant element. In an embodiment, once the path expressions have been generated, the document manager 312 can be configured to invoke the indexing engine 310 to index the first path expression.

According to an embodiment, the indexing engine 310 can receive the first path expression and can be configured to determine, in block 706, that the first descendant element is covered by a sub-path definition 420 of the multi-path index definition 400. For example, in an embodiment, the indexing engine 310 can be configured to compare the first path expression to the modified path expression of the sub-path definition 420 in order to determine that the first path expression matches the modified path expression.

Once this determination is made, the indexing engine 310 can be configured to automatically index, in block 708, the first descendant element according to the one or more index properties 422 of the sub-path definition 420. Indexing the first descendant element generates a path-value pair comprising the first path expression and a value associated with the first descendant element. The indexing engine 310 can be configured to store, in block 710, the path-value pair and a reference to the first structured document in a record in the multi-path index 600 associated with the multi-path index definition 400.

According to an embodiment, the multi-path index 600 is an inverted index, which stores a plurality of path-value pairs in plurality of separate records. Each path-value pair includes a reference that points, in an embodiment, to a list of documents in which the path-value pair appears. FIG. 6 illustrates an exemplary inverted multi-path index 600 that is configured to store a path-value pair 602 and at least one document reference 604 in a separate record. Each of the documents 322 referenced in the record includes the path-value pair 602 and is stored in the DBMS 300. In an embodiment, by storing each path-value pair 602 in an inverted index, such as that illustrated in FIG. 6, the index 600 can be used for many different combinations of query predicates without regard to ordering in the index definition and without regard to which keys are present in the query.

According to an embodiment, the inverted multi-path index 600 is configured to store unique path-value pairs 602. Accordingly, prior to storing a generated path-value pair in the inverted multi-path index 600, the indexing engine 310 is configured to determine whether the generated path-value pair matches an existing path-value pair 602 stored in the inverted index 600. In an embodiment, the indexing engine 310 can be configured to perform a lookup operation on the inverted index 600 to make this determination. When the generated path-value pair matches an existing path-value pair 602, the indexing engine 310 is configured to store a reference to the first structured document in a record associated with the existing path-value pair 602, and discards the generated path-value pair. Otherwise, when the generated path-value pair is unique, the path-value pair and a reference to the first structured document is stored in a record, as described above in block 710.

In an embodiment, the indexing engine 310 is configured to index each of the descendant elements of the first structured document in a similar manner to that described for the first descendant element. As mentioned above, the indexing engine 310 can index new elements so long as the new path expressions representing the new elements match the modified path expression(s) of the sub-path definition(s). During the indexing process, the indexing engine 310 can be configured, in an embodiment, to monitor a number of documents referenced by a path-value pair and to generate a selectivity factor (SF) 606 for the path-value pair 602 based on the number of structured documents referenced. According to an embodiment, the selectivity factor 606 can be inversely related to the number of documents referenced so that the selectivity factor decreases as the number of referenced documents increases. In other words, as a path-value pair 602 appears in more documents, its selectivity diminishes. The selectivity factor 606 for a path-value pair 602 can be stored in the record associated with the path value pair 602, and can be utilized to optimize query processing.

Figure 8:
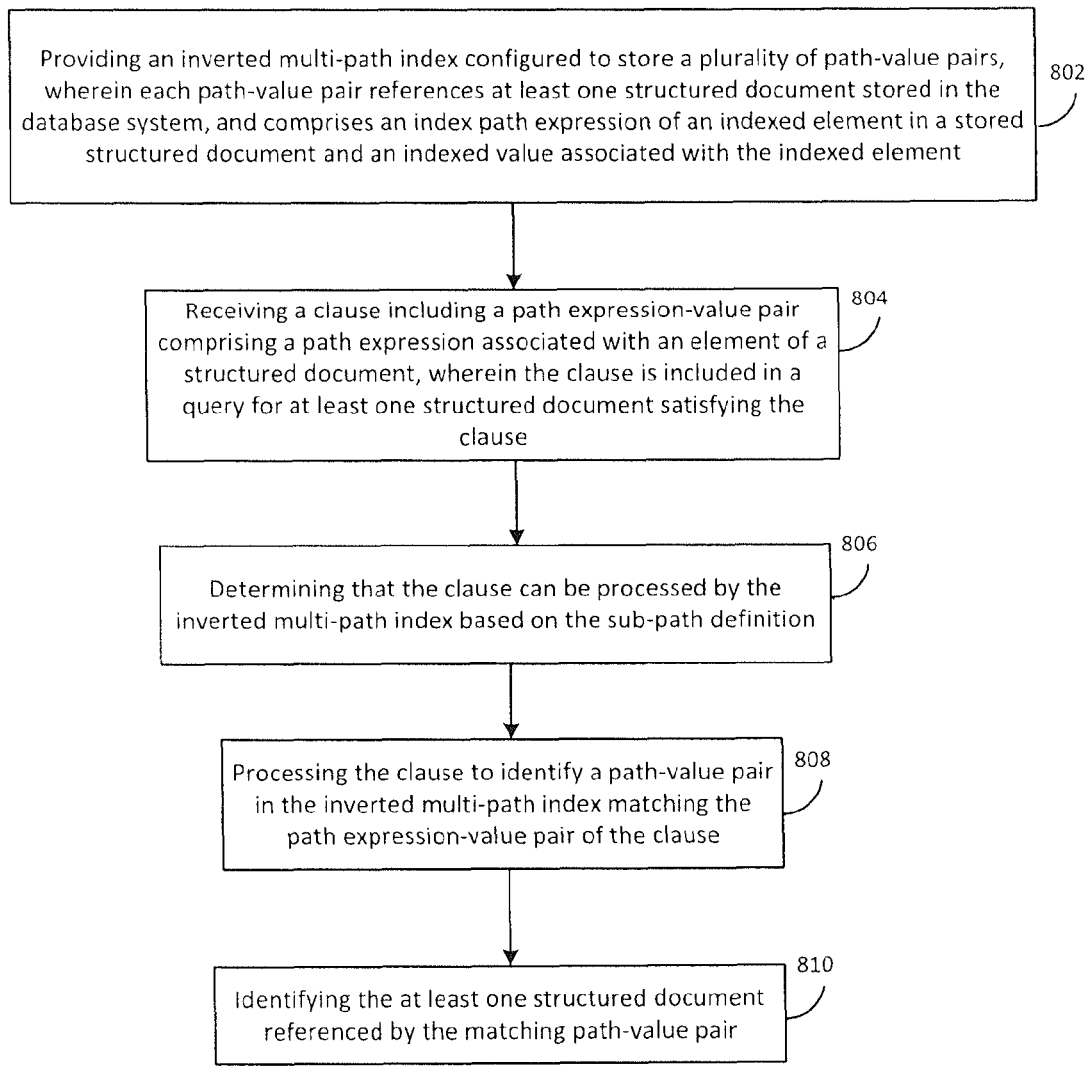
FIG. 8 is a flow diagram illustrating an exemplary method for processing a query according to an exemplary embodiment.

FIG. 8 is a flow diagram illustrating a method for processing a query according to an exemplary embodiment. The method illustrated in FIG. 8 can be carried out by at least some of the components in the exemplary arrangement of components illustrated in FIG. 3. As described above, and illustrated in block 802, an inverted multi-path index 600 configured to store a plurality of path-value pairs 602 and document references 604 to structured documents stored in the DBMS 300 is provided. As described above, each path-value pair 602 is generated when an element of a structured document is indexed according to a sub-path definition covering the element. The sub-path definition 420 is included in a multi-path index definition 400 associated with the inverted multi-path index 600; it covers a plurality of elements descending from a root element and includes at least one index property 422. Each index property 422 describes how the plurality of descendant elements covered by the sub-path definition 420 should be indexed.

According to an embodiment, a user can submit a query 510 to the database server 502 to retrieve documents 322 satisfying the query 510. The query processor 314, in an embodiment, can be configured to receive the query 510 via an incoming message handler 306 operating in the DBMS 300 in the execution environment 302 provided by the database server 502. In an embodiment, the query 510 can be received from a client, e.g., Client B 500*b*, via the network 540, the network subsystem 302 and optionally the higher protocol layer 304.

The query 510 can be, in an embodiment, an XQuery that typically includes a clause comprising a path expression representing a target element, and keys, values and/or element types. For example, the query, "/doc[metadata/description ftcontains 'cheese and crackers']" seeks all documents having a description element under a metadata element, where the description element (target element) contains a text string "cheese and crackers." Several additional exemplary queries are provided and described above. When the query 510 is received, the query processor 314 can be configured to parse the query to extract one or more clauses. In an embodiment, when the clause(s) is extracted from the query, the query processor 314 can be configured to invoke the indexing engine 310 to determine whether the clause can be processed by the inverted multi-path index 600.

In block 804, a clause including a path expression-value pair is received by the indexing engine 300. In an embodiment, the path expression-value pair comprises a path expression associated with an element of a structured document and the clause is included in a query for at least one structured document 322 satisfying the clause.

In block 806, the indexing engine 310 determines that the clause can be processed by the inverted multi-path index 600 based on the sub-path definition(s) 420 of the multi-path index definition 400. In an embodiment, the indexing engine 310 can make this determination by comparing the path expression in the clause to the modified path expression of the sub-path definition 420 and determining that the path expression in the clause matches the modified path expression. Moreover, the indexing engine 310 can determine that the index property 422 of the sub-path definition 420 can produce an indexed value satisfying the clause.

For example, consider the query, "/doc[metadata/description ftcontains 'cheese and crackers']" and the following sub-path definition for a main path definition, "/doc":
<sub-path full-text-search="true" modified-path="metadata//*"/>
The indexing engine 310 can determine that the path expression in the clause, "metadata/description" matches the modified path expression of the sub-path definition, "metadata//*." The indexing engine 310 can also determine that because each descendant element is indexed for a full-text-search, an indexed value satisfying the clause is possible. Accordingly, in this case, the indexing engine 310 can be configured to return a confirmation to the query processor 314 that the clause can be processed by the inverted multi-path index 600.

Alternatively, consider the same query and the following sub-path definition:
<sub-path value-comparison="true" modified-path="metadata//*"/>
In this case, each descendant element is indexed for value comparison and an indexed value satisfying the clause is not probable. Accordingly, the indexing engine 310 will determine that the clause cannot be processed by the inverted multi-path index 600, and can be configured to return a notification to that effect. Based on the response from the indexing engine 310, the query processor 314 can, in an embodiment, develop an execution plan to process the query 510.

In an embodiment, when the clause can be processed, the query processor 314 can invoke the indexing engine 310 to process the clause, in block 808, to identify a path-value pair 602 in the inverted multi-path index 600 matching the path expression-value pair of the clause. According to an embodiment, the indexing engine 310 can perform a lookup operation on the inverted multi-path index 600 to find a path-value pair 602 matching the path expression-value pair of the clause. When the matching path-value pair 602 is identified, the indexing engine 310 can identify, in block 810, the at least one structured document 604 referenced by the matching path-value pair 602.

According to an embodiment, the query can seek documents satisfying more than one condition, and therefore, the clause can have a first path expression-value pair joined with a second path expression-value pair. For example, the query can be "/doc [a/b='car' and a/d='goo']." In this case, the indexing engine 310 can be configured to identify a first path-value pair 602a in the inverted multi-path index 600 that matches the first path expression-value pair of the clause and to identify a second path-value pair 602b in the inverted multi-path index 600 that matches the second path expression-value pair of the clause. For example, the first path-value pair is "a/b:car" 602a and the second path-value pair is "a/d: goo" 602b.

In an embodiment, the indexing engine 310 intersects the structured documents referenced by the first path-value pair 604a with the structured documents referenced by the second path-value pair 604b, and identifies at least one common structured document referenced by the first path-value pair 602a and the second path-value pair 602b. For example, when the structured documents referenced by the first path-value pair 604a are intersected with the structured documents referenced by the second path-value pair 604b, the common document is document 305.

In an embodiment, the intersecting process can be optimized by processing the most selective path-value pair before the less selective path value pair. For example, referring to FIG. 6, the first path-value pair 602a is found in four (4) documents and has an SF of 25, while the second path-value pair 602b appears in two (2) documents and has an SF of 50. Accordingly, the second path-value pair 602b is more selective and the associated referenced documents 604b are processed first. In an embodiment, the indexing engine 310 compares the structured documents referenced by the second path-value pair 604b to the structured documents referenced by the first path-value pair 604a, thereby allowing the indexing engine 310 to skip non-matching structured documents referenced by the less selective first path-value pair 602a. Thus, during the intersecting of the structured documents 604a, 604b, the indexing engine 310 can skip document 202 and document 242 because the more selective second path-value pair 602a is already moving to document 305. Accordingly, fewer I/Os are required, saving cost and time.

According to exemplary embodiments, because each path-value pair 602 is stored in a separate record in an inverted index, composite indexes do not need to be defined to process queries having more than one search condition. Moreover, the ordering of the path expression-value pairs in the clause has no impact on the processing of the clause.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A method for configuring a multi-path index, the method comprising:
    receiving, by an indexing engine in a database management system configured to store a structured document in its native format, a multi-path index definition associated with a data model corresponding to the structured document; and
    storing, by the indexing engine, the multi-path index definition in a data structure associated with a multi-path index configured to store indexed data from a structured document conforming to the data model, the multi-path index definition including a first sub-path definition that covers a first plurality of descendant elements of a root element of the data model and a second sub-path definition that covers a second plurality of descendant elements of the root element of the data model, the multi-path index definition further including at least two index properties, wherein each of a plurality of descendant elements covered by the sub-path definitions is automatically indexed according to the at least two index properties that specify types of searches to be performed for the content of each of the descendant elements covered by the sub-path definitions, and wherein the at least two index properties are selected from a set of index properties including at least a full-text search, a value comparison, an element type definition, an enumerate repeating elements, and a start end marker.

2. The method of claim 1 wherein the first plurality of descendant elements is automatically indexed according to a first index property of the first sub-path definition and the second plurality of descendant elements is automatically indexed according to a second index property of the second sub-path definition.

3. The method of claim 1 wherein the sub-path definitions comprise a modified path expression configured to match a plurality of path expressions corresponding to the plurality of covered descendant elements.

4. The method of claim 3 wherein when the modified path expression ends with a first descendant element, the sub-path definitions covers a plurality of first descendant elements represented by a plurality of path expressions that include intervening elements between the root element and the first descendant element.

5. The method of claim 3 wherein when the modified path expression ends with a wildcard indicator, the sub-path definitions covers all descendant elements.

6. The method of claim 1 further comprising applying the multi-path index definition to at least one of an entire database storing structured documents represented by the data model, a single document represented by the data model, and a specific collection of structured documents represented by the data model.

7. The method of claim 1 further comprising:
receiving a modification to the data model, the modification comprising an addition of a new descendant element represented by a new path expression;
determining that the new descendant element is covered by one of the sub-path definitions; and
automatically indexing the new descendant element according to the at least one index property of the sub-path definition.

8. The method of claim 7 further comprising:
receiving a new sub-path definition including at least one index property and covering a plurality of descendant elements including the new descendant element; and
updating the multi-path index definition with the new sub-path definition.

9. The method of claim 1 wherein the database management system is an extensible markup language (XML) database management system and the structured document is an XML document.

10. A computer program product, comprising a non-transitory computer-readable medium having a computer-readable program code embodied therein, the computer-readable program code adapted to be executed by one or more processors to:
receive, by an indexing engine in a database management system configured to store a structured document in its native format, a multi-path index definition associated with a data model corresponding to the structured document; and
store, by the indexing engine, the multi-path index definition in a data structure associated with a multi-path index configured to store indexed data from a structured document conforming to the data model, the multi-path index definition including a first sub-path definition that covers a first plurality of descendant elements of a root element of the data model and a second sub-path definition that covers a second plurality of descendant elements of the root element of the data model, the multi-path index definition further including at least two index properties, wherein each of a plurality of descendant elements covered by the sub-path definitions is automatically indexed according to the at least two index properties that specify types of searches to be performed for the content of each of the descendant elements covered by the sub-path definitions, and wherein the at least two index properties are selected from a set of index properties including at least a full-text search, a value comparison, an element type definition, an enumerate repeating elements, and a start end marker.

11. A system for configuring a multi-path index, the system comprising:
a processor-based database management system, which when executed on a computer system will cause the processor to:
store a structured document in its native format;
receive a multi-path index definition associated with a data model corresponding to the structured document and to store the multi-path index definition in a data structure, the multi-path index definition including a first sub-path definition that covers a first plurality of descendant elements of a root element of the data model and a second sub-path definition that covers a second plurality of descendant elements of the root element of the data model, the multi-path index definition further including at least two index properties; and
a multi-path index in the database management system configured to store indexed data from a structured document conforming to the data model, wherein the indexing engine is configured to automatically index each of a plurality of descendant elements covered by the sub-path definitions according to the at least two index properties that specify types of searches to be performed for the content of each of the descendant elements covered by the sub-path definitions, and to store the indexed data in the multi-path index, and wherein the at least two index properties are selected from a set of index properties including at least a full-text search, a value comparison, an element type definition, an enumerate repeating elements, and a start end marker.

12. The system of claim 11 wherein the first plurality of descendant elements is automatically indexed according to a first index property of the first sub-path definition and the second plurality of descendant elements is automatically indexed according to a second index property of the second sub-path definition.

13. The system of claim 11 wherein the sub-path definitions comprises a modified path expression configured to match a plurality of path expressions corresponding to the plurality of covered descendant elements.

14. The system of claim 13 wherein when the modified path expression ends with a first descendant element, the sub-path definitions covers a plurality of first descendant elements represented by a plurality of path expressions that include intervening elements between the root element and the first descendant element.

15. The system of claim 13 wherein when the modified path expression ends with a wildcard indicator, the sub-path definition covers all descendant elements.

16. The system of claim 11 wherein the indexing engine is further configured to apply the multi-path index definition to at least one of an entire database storing structured documents represented by the data model, a single document represented by the data model, and a specific collection of structured documents represented by the data model.

17. The system of claim 11 wherein the indexing engine is further configured to receive a modification to the data model, the modification comprising an addition of a new descendant element represented by a new path expression, to determine that the new descendant element is covered by one of the sub-path definitions, and to automatically index the new descendant element according to the at least one index property of the sub-path definition.

18. The system of claim 17 wherein the indexing engine is further configured to receive a new sub-path definition including at least one index property and covering a plurality of descendant elements including the new descendant element, and to update the multi-path index definition with the new sub-path definition.

19. The system of claim 11 wherein the database management system is an extensible markup language (XML) database management system and the structured document is an XML document.

\* \* \* \* \*